US007943708B2

(12) United States Patent
Balk et al.

(10) Patent No.: US 7,943,708 B2
(45) Date of Patent: May 17, 2011

(54) METHOD FOR THE PRODUCTION OF TELECHELIC POLYMERS

(75) Inventors: Sven Balk, Frankfurt (DE); Gerd Loehden, Essen (DE); Christine Troemer, Hammersbach (DE); Monika Maerz, Alzenau (DE); Christine Miess, Kahl (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 12/522,269

(22) PCT Filed: Oct. 29, 2007

(86) PCT No.: PCT/EP2007/061616
§ 371 (c)(1),
(2), (4) Date: Jul. 7, 2009

(87) PCT Pub. No.: WO2008/092515
PCT Pub. Date: Aug. 7, 2008

(65) Prior Publication Data
US 2010/0010178 A1    Jan. 14, 2010

(30) Foreign Application Priority Data

Feb. 2, 2007    (DE) .................. 10 2007 006 105

(51) Int. Cl.
*C08F 2/38*    (2006.01)
(52) U.S. Cl. ......................................... 526/82
(58) Field of Classification Search .............. 526/82
See application file for complete search history.

(56) References Cited

U.S. PATENT DOCUMENTS

| 6,143,848 | A | 11/2000 | Lee et al. |
| 6,784,256 | B1 | 8/2004 | Lee et al. |
| 2007/0117948 | A1 | 5/2007 | Loehden et al. |
| 2008/0262176 | A1 | 10/2008 | Loehden et al. |
| 2009/0062508 | A1 | 3/2009 | Balk et al. |

FOREIGN PATENT DOCUMENTS

WO    99 20659    4/1999

OTHER PUBLICATIONS

Snijder, A. et al., "End-Group Modification of Poly(Butyl Acrylate) Prepared by Atom Transfer Radical Polymerization: Mechanistic Study Using Gradient Polymer Elution Chromatography", Journal of Polymer Science—Part A—Polymer Chemistry, vol. 40, pp. 2350-2359 (2002) XP-002447521.
Patton, D. L. et al., "A Facile Synthesis Route To Thiol-Functionalized α,ω-Telechelic Polymers Via Reversible Addition Fragmentation Chain Transfer Polymerization", Macromolecules, vol. 38, No. 20, pp. 8579-8602 (2005) XP-00244503.
U.S. Appl. No. 12/301,903, filed Nov. 21, 2008, Balk, et al.
U.S. Appl. No. 12/373,732, filed Jan. 14, 2009, Balk, et al.
U.S. Appl. No. 12/304,275, filed Dec. 11, 2008, Balk, et al.
U.S. Appl. No. 12/373,892, filed Jan. 15, 2009, Balk, et al.
U.S. Appl. No. 12/440,244, filed Mar. 6, 2009, Balk, et al.
U.S. Appl. No. 12/674,552, filed Feb. 22, 2010, Balk, et al.

*Primary Examiner* — Ling-Siu Choi
*Assistant Examiner* — Sonya Wright
(74) *Attorney, Agent, or Firm* — Oblon, Spivak, McClelland, Maier & Neustadt, L.L.P.

(57) ABSTRACT

The present invention relates to the coupling of two polymer chains to give end group-functionalized polymers, the simultaneous precipitation of transition metals from polymer solutions and to the removal of halogen atoms from polymer chain ends.

27 Claims, No Drawings

US 7,943,708 B2

METHOD FOR THE PRODUCTION OF TELECHELIC POLYMERS

FIELD OF THE INVENTION

The present invention relates to the synthesis of polymers which have functional end groups and have been prepared by means of atom transfer radical polymerization (referred to hereinafter as ATRP for short). A particular aspect is the preparation of telechelic polymethacrylates, polyacrylates or polystyrenes. The functional groups may, for example, be hydroxyl, amine, silyl or olefinic groups. The invention relates more particularly to the initiation of an ATRP with functionalized initiators and the polymerization-concluding coupling of two such monofunctionalized chains to give a telechelic polymer.

A very particular aspect of the present invention is that the addition of a coupling reagent in one process step simultaneously removes the transition metal compounds from the polymer solution by means of precipitation and forms salts of the ligands coordinated beforehand to the transition metal, which in turn enables simple removal thereof.

ATRP is an important process for preparing a multitude of polymers, for example polyacrylates, polymethacrylates or polystyrenes. This type of polymerization brings one a great deal closer to the goal of tailored polymers. The ATRP method was developed in the 1990s to a crucial degree by Prof. Matyjaszewski (Matyjaszewski et al., J. Am. Chem. Soc., 1995, 117, p. 5614; WO 97/18247; Science, 1996, 272, p. 866). ATRP affords narrowly distributed (homo)polymers in the molar mass range of $M_n$=5000-120 000 g/mol. A particular advantage is that both the molecular weight and the molecular weight distribution are controllable. As a living polymerization, it also permits the controlled formation of polymer architectures, for example random copolymers or else block copolymer structures. By means of appropriate initiators, for example, unusual block copolymers and star polymers are additionally obtainable. Theoretical bases of the polymerization mechanism are explained, inter alia, in Hans Georg Elias, Makromoleküle [Macromolecules], Volume 1, 6th Edition, Weinheim 1999, p. 344.

STATE OF THE ART

The development of a process step in ATRP in which, simultaneously, the halogen at the chain end of the polymer is removed, the transition metal is precipitated completely, the ligand is converted to an ionic form which can be removed easily and the coupling of two monofunctional polymer chains to a polymer which has been end group-functionalized at both ends can be undertaken is in no way prior art. This is already true merely for the combination of simultaneously transition metal precipitation and coupling of two chain ends. A combination of all three functions has not been described to date in the prior art. Hereinafter, this document is therefore restricted to the aspects of end group functionalization and coupling of two ATRP products.

The ATRP process is based on a redox equilibrium between a dormant species and an active species. The active species is the growing free-radical polymer chain present only in a low concentration and a transition metal compound in a relatively high oxidation state (e.g. copper(II)). The dormant species which is preferably present is the combination of the polymer chain terminated with a halogen or a pseudohalogen and the corresponding transition metal compound in a relatively low oxidation state (e.g. copper(I)). This is true both for ATRP in the actual form, which is initiated with (pseudo)halogen-substituted initiators, and for reverse ATRP which is described below, in which the halogen is not bound to the polymer chain until the equilibrium is established. The halogen atom remains on the particular chain ends after termination of the reaction irrespective of the process selected. These terminal halogen atoms may be useful in various ways. A large number of documents describe the use of such a polymer as a macroinitiator after a purification or by sequential addition of further monomer fractions to form block structures. As a representative example, reference is made to U.S. Pat. No. 5,807,937 with regard to sequential polymerization, and to U.S. Pat. No. 6,512,060 with regard to the synthesis of macroinitiators.

However, a problem is the thermal instability of such halogen-functionalized polymers, which is well known to those skilled in the art. Especially polymethacrylates or polyacrylates are found to be significantly more sensitive to depolymerization in the presence of terminal halogen atoms. A method for removing these terminal halogen atoms is therefore of great interest. One widespread process is based on the substitution of the halogens with metal alkoxides while precipitating the metal halide formed. Such a process is described, for example, in US 2005/0900632. A disadvantage of this method is the only limited availability of the metal alkoxides, their costs, and that the process can be performed in a separate process step only after a purification of the polymers. Moreover, direct functionalization with a hydroxyl group is not possible by this route. The situation is similar also for other processes for substituting the terminal halogen groups: both azides (see Matyjaszewski et al., Macromol. Rapid Commun, 18, 1057-66. 1997) and phosphines (Coessens, Matyjaszewski, Macromol. Sci. Pure Appl. Chem., 36, 653-666, 1999) lead only to incomplete conversions, are toxicologically very controversial, are poorly suited to direct hydroxyl functionalization and are expensive.

Moreover, these processes are only employable in a polymer-analogous reaction after a product workup.

According to the invention, the terminal halogen atoms are substituted by using a mercaptan, for example mercaptoethanol. Only in Snijder et al. (J. of Polym. Sci.: Part A: Polym. Chem.) is such a substitution reaction with mercaptoethanol described briefly. A difference from the present invention is the polymer-analogous procedure. In the document described, the substitution reaction is performed only after purification of the ATRP product in a second reaction stage. This gives rise directly to a second important difference from the present invention. The inventive effect of precipitating the transition metal compounds from the ATRP solution by adding mercaptan reagents is not described in this document.

Further alternatives are the scavenging of the chain ends present temporarily in free-radical form with stable hydroxy-functionalized free radicals such as nitroxides (see, for example: Beyou et al., Macromol. Chem. Phy., 202, 974-9, 2001) or by controlled recombination of the free-radical chain ends with preceding use of hydroxyl-bearing initiators. Both processes require an additional time-consuming intervention into the polymerization process. This may, for example, be temperature increases which are unfavourable from a process technology point of view. It is also readily apparent to the person skilled in the art that this process neither eases the catalyst removal nor can lead to the polymers typical of ATRP with narrow molecular weight distributions. This method is often described in literature as ATRA (Atom transfer radical addition). One variant of ATRA is the addition of reagents which decompose into two free radicals in situ, of which one in turn irreversibly scavenges a free-radical chain end and the second smaller free radical starts new chains. A disadvantage of this method, as well as the reaction rate which is again reduced, is the poor commercial availability of the reagents required and the release of additional free radicals which either have to be scavenged very rapidly or else lead to undesired oligomeric by-products. This process is described by way of example in the studies by Sawamoto (Macromolecules, 31, 6708-11, 1998 and J Polym. Sci. Part A: Polym. Chem., 38, 4735-48, 2000). One variant of ATRA is the end-capping of growing polymer chains with monomer units which can be incorporated onto the chain end once in free radical form, but then form a stable halogenated chain end and correspondingly prevent further chain growth. These monomer units may, for example, be olefins which may indeed also themselves be functionalized. One example of such a compound with a hydroxyl group is allyl alcohol (Coessens, Matyjaszewski, Macromol. Rapid Commun., 20, 127-134, 1999). In a polymerization with bifunctional initiators and capping at both ends, it is possible by this route to prepare hydroxytelechelics. A disadvantage of this process compared to the process according to the invention are the still brominated and hence thermally unstable chain end, the lack of parallel precipitation of the transition metal compounds and incomplete conversion of the chain ends (see Keul et al., Macrom. Symp., 161, 63-72, 2000).

A further variant of ATRA is so-called ATRC (Atom transfer radical coupling). ATRC dates back to Fukuda (e-polymers, no. 013, 2002) and is described in detail in Matyjaszewski (Macromol. Chem. Phys., 205, 154-164, 2004) for polystyrenes. In this method, in a first step, hydroxyl-bearing brominated initiators are used for the ATRP of styrene. After the product purification, the system is admixed with $Cu^{(0)}$ and a ligand known, for example, from ATRP. With this novel catalyst system, the two chain ends are coupled with removal of the terminal bromine atoms. The original, still hydroxy-functionalized initiator residues constitute the new chain ends in this polymer. However, a disadvantage is that the system is applicable only for a limited number of monomers. For instance, coupling of acrylates or methacrylates works only when short styrene segments are incorporated at the end of the ATRP. Other disadvantages are again the separate performance and the addition of further copper compounds, which have to be removed again in a laborious manner.

In contrast, a simpler method is end group functionalization at both ends with simultaneously controlled polymerization conditions using RAFT polymerization (Reversible addition fragmentation chain transfer polymerization). In this process, the radical is transferred to a specific RAFT agent, which, in the further course of the polymerization, functions, for example, reciprocally as a bifunctional free-radical transfer reagent. In the transfer, a hydroxy-functional part of the agent, for example, is positioned onto the later chain end. The use of such dihydroxy-functionalized RAFT agents can be read about, for example, in Lima et al. (J. of Polym. Sci., Part A: Polym. Chem., 43, 959-73, 2005). A great disadvantage of these RAFT products compared to ATRP products and especially compared to the inventive polymers is the reduced thermal stability of the radicals of the RAFT agents incorporated in the polymer, which are usually trithiocarbonates. Further disadvantages are the possible product colour and the strong odour of remaining sulphur compounds, which can be released, for example, in the event of thermal degradation. In contrast, the thioether groups incorporated into the polymer chain in accordance with the invention are significantly more thermally stable. This is evident to the person skilled in the art very readily from the polymer properties of polymers prepared by free-radical means with addition of mercaptan-based regulators as a comparative substance.

Hydroxy-functionalized polyacrylates, polymethacrylates or polystyrenes can find use in wide fields of use. The hydroxyl group can exert a plurality of functions at the same time. Firstly, polar groups influence the miscibility of polymers and hence, for example, the mechanical properties of polymer blends. Moreover, hydroxyl groups have great significance in relation to surface adhesion. This is true, for example, both of the adhesion to surfaces, as is needed in coatings or varnishes. However, this is also true of the surface adhesion to ultrasmall particles, as required, for example, in the dispersion of pigments or fillers. Hydroxyl groups are important thirdly and not least as reactive groups. These find use especially in reactive adhesives, sealants and hotmelt adhesives. Since the polymers prepared by the process according to the invention have a relatively low hydroxyl content, the significance of poly(meth)acrylates with narrow widths of the molecular weight distribution in reactive adhesives is considered as an example in the further consideration of the prior art. This is intended only to illustrate the improvement over the prior art using a potentially important use example of the polymers prepared by the process according to the invention. However, the examples do not serve to restrict the precise composition or the use of the polymers in any way:

Reactive adhesives are substances solid at room temperature. They are melted by heating and applied to a substrate. In the course of cooling, the adhesive solidifies again and thus binds the substrate. In addition, the polymers present in the adhesive crosslink by reaction with moisture. This procedure causes final, irreversible curing.

Such adhesives are described, for example, in U.S. Pat. No. 5,021,507. The main constituent of these adhesives is compounds with free isocyanate groups, which are usually obtained by condensation reaction of an excess of polyisocyanate groups with polyols. To improve the adhesion properties to particular substrates, binders consisting of polymers of ethylenically unsaturated monomers have been added to these compounds with free isocyanate groups. The binders used are typically polyalkyl (meth)acrylates with $C_1$-$C_{20}$-alkyl groups. These are prepared from the corresponding monomers either before the addition to the urethanes or in their presence by means of free-radical polymerization.

U.S. Pat. No. 5,866,656 and EP 1036103 describe reactive hotmelt adhesives in which the binder of poly(meth)acrylate is bonded covalently to the compounds with free isocyanate groups in the adhesive composition. Since this bonding is usually caused by a condensation reaction, such adhesives in which this bond is formed are referred to as adhesives in the condensation stage. The adhesives thus obtained feature, compared to those described in U.S. Pat. No. 5,021,507, an increased elasticity and improved adhesion to particular metal substrates, and a longer open time—in which they are available for processing.

However, these reactive hotmelt adhesives have considerable disadvantages. For example, they have only a low initial strength. This results in a particularly long, disadvantageous setting time after the application of the adhesive.

A further disadvantage of the binders for prior art reactive adhesives is the high viscosity, which is relevant in the course of processing. As a result, processing of the molten reactive hotmelt adhesive, in particular the application to porous substrates, is complicated significantly. In some cases, gelling also occurs in the condensation stage.

A further disadvantage is that the extractable content in the cured adhesive is quite high. Among other factors, this reduces the stability of the adhesive composition to solvents.

A further disadvantage is frequently only inadequate viscosity stability of the reactive hotmelt adhesive in the melt at, for example, 130° C., which complicates processability in particular.

A further disadvantage is that the free-radically polymerized materials also comprise a relatively high proportion of low molecular weight constituents which do not take part in the crosslinking reactions and constitute reactive hotmelt adhesives corresponding to the extractable constituent.

The ATRP method brings one a good deal closer to the target of tailored polymers. The ATRP has also been developed specifically with 2-hydroxyethyl (meth)acrylate (HEMA) as a hydroxyl-bearing monomer (Beers et al., Macromolecules; 1999, 32, p. 5772-5776).

The above-described problems have been solved in WO 05/047359 to the extent that use of a controlled polymerization method, in the form of ATRP, allowed binders with very narrow molecular weight distributions to be provided, which have an only low proportion of high molecular weight constituents by the compared to free-radically polymerized (meth)acrylates. These constituents bring about, in particular, an increase in the viscosity in polymer mixtures. Moreover, these polymers also comprise a significantly lower proportion of low molecular weight and hence extractable constituents. The lower proportion of such constituents increases the weathering stability, slows the product ageing and leads to a significantly improved chemical stability.

A disadvantage of the reactive adhesives prepared according to WO 05/047359 is, however, a random distribution of the hydroxyl, mercapto or amino groups in the polymer chain of the binder. This leads to close-meshed crosslinking and a thus reduced elasticity of the adhesive composition. This can also result in a deterioration in the substrate binding. This disadvantage is manifested especially when, in addition, the polyisocyanates, as a constituent of the reactive hotmelt adhesive, are functionalized with a relatively large number of free isocyanate groups. In this case, a poly(meth)acrylate with exclusive end group functionalization is highly advantageous in several ways as a coformulation constituent: firstly, selection of suitable polyisocyanates allows longer processing times to be established. Secondly, polymer networks in which one component is incorporated only via the chain end groups retain exceptional flexibility. This increased flexibility of the networks with simultaneously higher stability is also of great significance in other application sectors, for example in sealants.

For a listing and description of the compounds bearing free isocyanate groups, reference is made to WO 05/047359.

PROBLEM

It is an object of the present invention to couple one chain end each of two polymers prepared by atom transfer radical polymerization (ATRP) to one another by means of a suitable reagent.

It is an additional object of the present invention to prepare polymers by means of ATRP which have functional groups on more than 90% of the chain ends. These functional groups may be, in particular, hydroxyl, amino, silyl or olefinic groups.

It is an additional object of the present invention to prepare polymers by means of ATRP which contain halogens or pseudohalogens only in traces, if at all. It is therefore also an object to improve the thermal stability of these polymers compared to halogenated products.

In particular, it is an object of this invention to perform the functionalization and the simultaneous halogen removal in a process which is simple to implement and economically viable on the industrial scale. Very particularly, it is an object to perform the functionalization without additional product workup directly at the end of the actual ATRP process in the same reaction vessel (one-pot reaction).

It is a parallel object of this invention to provide, with the same process step, simultaneously a process implementable on the industrial scale for removing transition metal complexes from polymer solutions. At the same time, the novel process should be inexpensive and rapidly performable. Furthermore, it was an object of the present invention to provide a process which can be implemented without complicated modifications to known plants suitable for solution polymerization. It was a further object, as early as after a filtration step, to realize particularly low residual concentrations of the transition metal complexes.

SOLUTION

This object is achieved by initiating an ATRP with a bifunctional initiator which has a functionality X and optionally a further functionality $F_1$. X is a functionality typically used to initiate an ATRP, for example a halogen atom or a pseudohalogen group. $F_1$ is a second functionality which is not effective as an initiator under ATRP conditions. In particular, it may be a hydroxyl, amine, silyl or olefinic group.

After the polymerization has ended, the reaction is terminated by adding a termination reagent. A further part of this invention is that this termination reagent is a bifunctional compound having two functionalities $F_2$. $F_2$ is a group which is capable of substituting the functionality X on the previously polymerization-active chain end of the polymer. In particular, $F_2$ is a thiol group. Use of bifunctional termination reagents makes it possible in this way to couple two polymers to one another by one chain end each.

Substitution of the terminal active groups of a polymer synthesized by means of ATRP with said sulphur compounds functionalizes the particular chain ends with the second group $F_2$. This in turn reacts with substitution by the active chain end bearing an X group of a second polymer to couple the two polymer chains. At the same time, the terminal halogen atoms are removed from the polymer, the transition metal coordination compound used as a catalyst is quenched and the metal is thus precipitated virtually completely. It can subsequently be removed in a simple manner by means of filtration.

In detail, the addition of mercaptans to halogen-terminated polymer chains, as are present during or at the end of an ATRP process, leads to substitution of the halogen. At the chain end of the polymer, a thioether group thus forms, as already known from free-radical polymerization with sulphur-based regulators. As an elimination product, a hydrogen halide is formed.

A very particular aspect of the present invention is that, as a result of the addition of a reagent in one process step, simultaneously, the terminal halogen atoms are removed from the polymer chains, the transition metal compounds are removed by means of precipitation and salts are formed from the ligands coordinated beforehand to the transition metal, which in turn enables simple removal of the ligands from the transition metal.

In detail, what occurs when said sulphur compound is added is probably the following: the initiators used are in the ATRP compounds which have one or more atoms or atom groups X which are free-radically transferable under the polymerization conditions of the ATRP process. When the active X group on the particular chain end of the polymer is substituted, an acid of the form X—H is released. The hydrogen halide which forms cannot be hydrolysed in organic polymerization solutions and therefore has a particularly marked reactivity which leads to protonation of the usually basic ligands described below on the transition metal compound. This quenching of the transition metal complex proceeds exceptionally rapidly and gives rise to direct precipitation of the now unmasked transition metal compounds.

The transition metal generally precipitates out in the form in which it has been used at the start of the polymerization: for example, in the case of copper, as CuBr, CuCl or $Cu_2O$. Under the condition that the transition metal is oxidized simultaneously, for example by introduction of air or by addition of sulphuric acid, the transition metal compound additionally precipitates out in the higher oxidation state. The inventive addition of said sulphur compounds allows the transition metal precipitation additionally to be effected virtually quantitatively, unlike this oxidation-related precipitation. For instance, it is possible, as early as after a filtration step, to realize particularly low residual concentrations of the transition metal complexes of below 5 ppm.

In order to achieve this effect, the inventive use of said sulphur compound, based on the active X group at the polymer chain end, must be used only in a ratio of, for example, 0.55 equivalent. This corresponds to a ratio of mercapto groups to the active X group of 1.1 equivalents. A higher excess would lead, as is clearly evident to those skilled in the art, to a considerably worse coupling yield.

A corresponding ratio applies based on ligands L: in the case of complexes in which the transition metal and the ligand are present in a ratio of 1:1, likewise only a very small excess of the sulphur compound is required to achieve complete quenching of the transition metal complex. Examples of such ligands are N,N,N',N'',N''-pentamethyldiethylenetriamine (PMDETA), which is described below, and tris(2-aminoethyl)amine (TREN).

An additional part of this invention is that the sulphur compounds used can be bonded virtually completely to the polymer chains, and that the residual sulphur fractions can be removed completely and quite simply in the filtration by means of simple modifications. In this way, products which do not have an unpleasant odour caused by sulphur compounds are obtained.

A great advantage of the present invention is the efficient removal of the transition metal complexes from the solution. Use of the process according to the invention makes it possible to reduce the transition metal content with a filtration by at least 80%, preferably by at least 95% and most preferably by at least 99%. In particular embodiments, it is even possible by use of the process according to the invention to reduce the transition metal content by more than 99.9%.

The reagents with two $F_2$ groups added to the polymer solution in accordance with the invention after or during the termination of polymerization are preferably compounds which contain sulphur in organically bound form. Especially preferably, the two $F_2$ groups in these sulphur compounds used for the precipitation of transition metal ions or transition metal complexes are two SH groups. Very particularly preferred organic compounds include bifunctionalized mercaptans or compounds which can correspondingly form two thiol groups under the dissolution conditions. The organic compounds may be organic compounds such as dithioglycol, 1,3-propanedithiol, 1,4-butanedithiol, 1,5-pentanedithiol or 3,4-dimercaptotoluene. The compounds may also contain an ether group, thioether group, ester group, amide group, urethane group or other group containing heteroatoms. One example of such a dithiol would be 2,2'-oxydiethanethiol.

In one variation, it is also possible that said bifunctional termination reagent, as well as the two $F_2$ groups, has one or more additional functionalities $F_3$. These $F_3$ groups do not enter into a substitution reaction with the X group and may be the same or else different from the $F_1$ group. The use of such a compound makes it possible to prepare polymers which are mono- or polyfunctionalized exactly in the middle of the chain, or polymers which are functionalized exactly at the chain ends and in the chain middle. One example of such a compound would be 2,3-dimercapto-1-propanol; examples of compounds having two functional groups would be meso-2,3-dimercaptosuccinic acid, 1,4-dithioerythritol or various 1,4-dithiothreitols.

The especially preferred compounds are commercially readily available compounds which are used as regulators in free-radical polymerization. The advantage of these compounds is their easy availability, their low cost and the wide range of possibilities, which enable optimal adjustment of the precipitation reagents to the particular polymerization system.

However, the present invention cannot be restricted to these compounds and examples. Instead, what is crucial is that the precipitants used have two —SH— groups or form two —SH— groups in situ under the present conditions of the polymer solution.

In the free-radical polymerization, the amount of regulators, based on the polymers to be polymerized, is usually stated to be 0.05% by weight to 5% by weight. In the present invention, the amount of the sulphur compound used is not based on the monomers but rather on the concentration of the polymerization-active chain ends in the polymer solution. Polymerization-active chain ends means the sum of dormant and active chain ends. The inventive sulphur-containing precipitants are, for this purpose, based on the initial concentration of initiator, used in at most 1 molar equivalent, preferably at most 0.7 molar equivalent, more preferably below 0.6 molar equivalent and most preferably at 0.5 molar equivalent. The remaining residual amounts of sulphur can be removed easily by modifying the subsequent filtration step.

It is readily apparent to the person skilled in the art that the mercaptans described cannot have any further influence on the polymers when they are added to the polymer solution during or after termination of the polymerization, with the exception of the substitution reaction described. This is true especially for the width of the molecular weight distributions, the molecular weight, additional functionalities, glass transition temperature, and melting point in the case of semicrystalline polymers and polymer architectures.

Moreover, it is readily apparent to the person skilled in the art that a corresponding process which is based, in apparatus terms, exclusively on a filtration of the polymer solution can be implemented easily in an industrial-scale process without any great modifications to existing solution polymerization plants.

A further advantage of the present invention is that the reduction to one filtration step or a maximum of two filtration steps allows a very rapid workup of the polymer solution compared to many established systems.

In addition, the substitution, the precipitation and the subsequent filtration are effected at a temperature in the range between 0° C. and 120° C. and other process parameters within a common range.

To reduce the last traces of sulphur compounds, adsorbents or adsorbent mixtures can be used. This can be effected in parallel or in successive workup steps. The adsorbents are known from the prior art, preferably selected from the group of silica and/or aluminium oxide, organic polyacids and activated carbon (e.g. Norit SX plus from Norit).

The removal of the activated carbon can also be effected in a separate filtration step or in a filtration step simultaneous with the transition metal removal. In a particularly efficient variant, the activated carbon is not added to the polymer solution as a solid, but rather the filtration is effected by means of filters laden with activated carbon, which are commercially available (e.g. AKS 5 from Pall Seitz Schenk). It is also possible to use a combination of the addition of the above-described acidic assistants and activated carbon, or of the addition of the above-described assistants and filtration through filters laden with activated carbon.

The present invention relates to end group functionalization of polymers to couple two polymer chains, the removal of the terminal halogen atoms and of the transition metal complexes from all polymer solutions prepared by means of ATRP processes. The possibilities which arise from the ATRP will be outlined briefly hereinafter. However, these enumerations are not capable of describing ATRP and hence the present invention in a restrictive manner. Instead, they serve to indicate the great significance and various possible uses of ATRP and hence also of the present invention for the workup of corresponding ATRP products.

The monomers polymerizable by means of ATRP are sufficiently well known. A few examples are listed below without restricting the present invention in any way. The notation "(meth)acrylate" describes the esters of (meth)acrylic acid and here means both methacrylate, for example methyl methacrylate, ethyl methacrylate, etc., and acrylate, for example methyl acrylate, ethyl acrylate, etc., and mixtures of the two.

Monomers which are polymerized are selected from the group of the (meth)acrylates, for example alkyl (meth)acrylates of straight-chain, branched or cycloaliphatic alcohols having 1 to 40 carbon atoms, for example methyl (meth) acrylate, ethyl (meth)acrylate, n-butyl (meth)acrylate, i-butyl (meth)acrylate, t-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth) acrylate; aryl (meth)acrylates, for example benzyl (meth) acrylate or phenyl (meth)acrylate, each of which may be unsubstituted or have mono- to tetra-substituted aryl radicals; other aromatically substituted (meth)acrylates, for example naphthyl (meth)acrylate; mono(meth)acrylates of ethers, polyethylene glycols, polypropylene glycols or mixtures thereof having 5-80 carbon atoms, for example tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate and poly(propylene glycol) methyl ether (meth)acrylate. The monomer selection may also include particular hydroxy-functionalized and/or amino-functionalized and/or mercapto-functionalized and/or an olefinically functionalized acrylates or methacrylates, for example allyl methacrylate or hydroxyethyl methacrylate.

In addition to the (meth)acrylates listed above, the compositions to be polymerized may also consist of other unsaturated monomers or comprise them. These include 1-alkenes such as 1-hexene, 1-heptene, branched alkenes, for example vinylcyclohexane, 3,3-dimethyl-1-propene, 3-methyl-1-diisobutylene, 4-methyl-1-pentene, acrylonitrile, vinyl esters, for example vinyl acetate, in particular styrene, substituted styrenes having an alkyl substituent on the vinyl group, for example α-methylstyrene and α-ethylstyrene, substituted styrenes having one or more alkyl substituents on the ring, such as vinyltoluene and p-methylstyrene, halogenated styrenes, for example monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; maleic acid derivatives, for example maleic anhydride, maleimide, methylmaleimide and dienes, for example divinylbenzene, and also the particular hydroxy-functionalized and/or amino-functionalized and/or mercapto-functionalized and/or an olefinically functionalized compounds. In addition, these copolymers can also be prepared in such a way that they have a hydroxyl and/or amino and/or mercapto functionality and/or an olefinic functionality in a substituent. Such monomers are, for example, vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles.

The process can be performed in any halogen-free solvents. Preference is given to toluene, xylene, acetates, preferably butyl acetate, ethyl acetate, propyl acetate; ketones, preferably ethyl methyl ketone, acetone; ethers; aliphatics, preferably pentane, hexane; alcohols, preferably cyclohexanol, butanol, hexanol, but also biodiesel.

Block copolymers of the AB composition may be prepared by means of sequential polymerization. These polymers can be coupled to give block copolymers of the BA-AB type. Combination of hard and soft blocks makes it possible in this way to realize a further property profile—and hence wider usability—of the inventive products. More complex block structures with distribution of additional functionalities or further blocks are another option.

The polymerization can be performed at standard pressure, reduced pressure or elevated pressure. The polymerization temperature too is uncritical. In general, it is, however, in the range of −20° C. to 200° C., preferably of 0° C. to 130° C. and more preferably of 50° C. to 120° C.

The polymers obtained in accordance with the invention preferably have a number-average molecular weight between 5000 g/mol and 120 000 g/mol, and more preferably between 7500 g/mol and 50 000 g/mol.

It has been found that the molecular weight distribution is below 1.8, preferably below 1.6, more preferably below 1.4 and ideally below 1.2.

The initiator used may be any compound which has one atom or one atom group X which are free-radically transferable under the polymerization conditions of the ATRP process. The active X groups are generally Cl, Br, I, SCN and/or $N_3$. In general terms, suitable initiators include the following formulae:

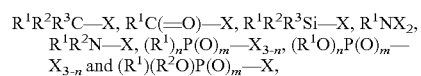

where X is selected from the group consisting of Cl, Br, I, $OR^4$, $SR^4$, $SeR^4$, $OC(=O)R^4$, $OP(=O)R^4$, $OP(=O)(OR^4)_2$, $OP(=O)OR^4$, $O-N(R^4)_2$, CN, NC, SCN, NCS, OCN, CNO and $N_3$ (where $R^4$ is an alkyl group of 1 to 20 carbon atoms, where each hydrogen atom may be replaced independently by a halogen atom, preferably fluoride or chloride, or alkenyl of 2 to 20 carbon atoms, preferably vinyl, alkenyl of 2 to 10 carbon atoms, preferably acetylenyl, phenyl which may be substituted by 1 to 5 halogen atoms or alkyl groups having 1 to 4 carbon atoms, or aralkyl, and where $R^1$, $R^2$ and $R^3$ are each independently selected from the group consisting of hydrogen, halogens, alkyl groups having 1 to 20, preferably 1 to 10 and more preferably 1 to 6 carbon atoms, cycloalkyl groups having 3 to 8 carbon atoms, silyl groups, alkylsilyl groups, alkoxysilyl groups, amine groups, amide groups, COCl, OH, CN, alkenyl or alkynyl groups having 2 to 20 carbon atoms, preferably 2 to 6 carbon atoms, and more preferably allyl or vinyl, oxiranyl, glycidyl, alkenyl or alkenyl groups which have 2 to 6 carbon atoms and are substituted by oxiranyl or glycidyl, aryl, heterocyclyl, aralkyl, aralkenyl (aryl-substituted alkenyl where aryl is as defined above and alkenyl is vinyl which is substituted by one or two $C_1$- to $C_6$-alkyl groups in which one to all of the hydrogen atoms, preferably one hydrogen atom, are substituted by halogen (preferably fluorine or chlorine when one or more hydrogen atoms are replaced, and preferably fluorine, chlorine or bromine if one hydrogen atom is replaced)), alkenyl groups which have 1 to 6 carbon atoms and are substituted by 1 to 3 substituents (preferably 1) selected from the group consisting of $C_1$- to $C_4$-alkoxy, aryl, heterocyclyl, ketyl, acetyl, amine, amide, oxiranyl and glycidyl, and m=0 or 1; m=0, 1 or 2. Preferably not more than two of the $R^1$, $R^2$ and $R^3$ radicals are hydrogen; more preferably, not more than one of the $R^1$, $R^2$ and $R^3$ radicals is hydrogen.

The particularly preferred, not additionally functionalized initiators include benzyl halides such as p-chloromethylstyrene, hexakis(α-bromomethyl)-benzene, benzyl chloride, benzyl bromide, 1-bromo-i-phenylethane and 1-chloro-i-phenylethane. Particular preference is further given to carboxylic acid derivatives which are halogenated at the α-position, for example propyl 2-bromopropionate, methyl 2-chloropropionate, ethyl 2-chloropropionate, methyl 2-bromopropionate or ethyl 2-bromoisobutyrate. Preference is also given to tosyl halides such as p-toluenesulphonyl chloride; alkyl halides such as tetrachloromethane, tribromoethane, 1-vinylethyl chloride or 1-vinylethyl bromide; and halogen derivatives of phosphoric esters such as dimethylphosphonyl chloride.

A second group of initiators is that of the compounds which have additionally been functionalized with an $F_1$ group and are of the general structure X—R—$F_1$ where X is the free-radically transferable group in the ATRP which has already been described above. $F_1$ is a hydroxyl, amino, tert-butyl, epoxy, vinyl, allyl, cyano, silyl or azide group. R is an organic radical.

Especially preferred are initiators of the structure:

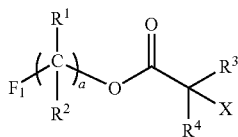

$R^1$, $R^2$, $R^3$ and $R^4$ here are any organic radicals. Preferably, $R^1$ and $R^2$ are both hydrogen. $R^3$ and $R^4$ are preferably hydrogen and/or $CH_3$ groups. a is any number from 0 to 12, preferably from 0 to 6 and more preferably from 0 to 2. Examples of difunctionalized initiators of this structure are tert-butyl 2-bromopropionate, tert-butyl 2-bromoisobutyrate, hydroxyethyl 2-bromopropionate, hydroxyethyl 2-bromoisobutyrate, vinyl chloroacetate, allyl chloroacetate, glycidyl 2-bromopropionate and glycidyl 2-bromoisobutyrate.

Initiators which, like tert-butyl 2-bromopropionate, are a tert-butyl ester should be considered as prepolymers to an acid functionalization. It is known to those skilled in the art how simple it is to convert a tert-butyl ester to an acid, for example thermally with elimination of isobutene.

One exception to the initiator selection listed is that of the cyano-functional initiators, which usually do not have an ester group. Examples include 4-cyanobenzyl bromide, bromoacetonitrile and 2-bromocyanopropane.

A comprehensive listing of bifunctionalized initiators for ATRP can be found, inter alia, in Matyjaszewski, ACS Symp. Series, 1998, 685 p. 411 ff.

If all of the monomer used is converted, the later molecular weight is determined from the ratio of initiator to monomer.

Catalysts for ATRP are detailed in Chem. Rev. 2001, 101, 2921. Predominantly copper complexes are described—other compounds also used include those of iron, cobalt, chromium, manganese, molybdenum, silver, zinc, palladium, rhodium, platinum, ruthenium, iridium, ytterbium, samarium, rhenium and/or nickel. In general, it is possible to use all transition metal compounds which can form a redox cycle with the initiator or the polymer chain which has a transferable atom group. For this purpose, copper can be supplied to the system, for example, starting from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is a variant thereof: in so-called reverse ATRP, it is possible to use compounds in higher oxidation states, for example $CuBr_2$, $CuCl_2$, CuO, $CrCl_3$, $Fe_2O_3$ or $FeBr_3$. In these cases, the reaction can be initiated with the aid of classical free-radical formers, for example AIBN. This initially reduces the transition metal compounds, since they are reacted with the free radicals obtained from the classical free-radical formers. Reverse ATRP has also been described, inter alia, by Wang and Matyjaszewski in Macromolecules (1995), Vol. 28, p. 7572 ff.

A variant of reverse ATRP is that of the additional use of metals in the zero oxidation state. Assumed comproportionation with the transition metal compounds of the higher oxidation state brings about acceleration of the reaction rate. This process is described in detail in WO 98/40415.

The molar ratio of transition metal to monofunctional initiator is generally within the range of 0.01:1 to 10:1, preferably within the range of 0.1:1 to 3:1 and more preferably within the range of 0.5:1 to 2:1, without any intention that this should impose a restriction.

The molar ratio of transition metal to bifunctional initiator is generally within the range of 0.02:1 to 20:1, preferably within the range of 0.2:1 to 6:1 and more preferably within the range of 1:1 to 4:1, without any intention that this should impose a restriction.

In order to increase the solubility of the metals in organic solvents and simultaneously to avoid the formation of stable and hence polymerization-inactive organometallic compounds, ligands are added to the system. In addition, the ligands ease the abstraction of the transferable atom group by the transition metal compound. A list of known ligands can be found, for example, in WO 97/18247, WO 97/47661 or WO 98/40415. As a coordinative constituent, the compounds used as a ligand usually have one or more nitrogen, oxygen, phosphorus and/or sulphur atoms. Particular preference is given in this context to nitrogen compounds. Very particular preference is given to nitrogen-containing chelate ligands. Examples include 2,2'-bipyridine, N,N,N',N",N"-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable information on the selection and combination of the individual components can be found by the person skilled in the art in WO 98/40415.

These ligands can form coordination compounds with the metal compounds in situ or they can be prepared initially as coordination compounds and then be added to the reaction mixture.

The ratio of ligand (L) to transition metal is dependent upon the denticity of the ligand and the coordination number of the transition metal (M). In general, the molar ratio is in the range of 100:1 to 0.1:1, preferably 6:1 to 0.1:1 and more preferably 3:1 to 1:1, without any intention that this should impose a restriction.

What is crucial for the present invention is that the ligands are protonatable.

Preference is given to ligands which are present in the coordination compound in a ratio of 1:1 relative to the transition metal. When ligands such as 2,2'-bipyridine are used, which are bound within the complex in a ratio relative to the transition metal of 2:1, complete protonation can be effected only when the transition metal is used in a significant deficiency, of for example, 1:2 relative to the active chain end X. However, such a polymerization would be greatly slowed compared to one with equivalent complex-X ratios and, owing to incomplete protonation with equivalent use, not preferred.

For the inventive end group-functionalized products, there is a broad field of application. A person skilled in the art will readily understand what significance hydroxyl-, amino-, silyl- or olefinically-terminated polymers can have in various uses. The selection of the use examples is not capable of restricting the use of the inventive polymers. The examples shall serve solely to indicate the wide range of possible uses of the polymers described by way of random sample. For example, polymers synthesized by means of ATRP are used as prepolymers in hotmelt adhesives, other adhesives, sealants, heat-sealing materials or for polymer-analogous reactions. The polymers may also find use in formulations for cosmetic use in coating materials, in varnishes, as dispersants, as a polymer additive or in packagings.

However, halogen-free polymers which are unfunctionalized or mono- or difunctionalized in the middle of the chain by means of the coupling reagent and have a narrow molecular weight distribution, as can likewise be prepared by the process according to the invention, have great advantages over the prior art binders and prepolymers.

The examples given below are given for better illustration of the present invention but are not capable of restricting the invention to the features disclosed herein.

EXAMPLES

The present examples were based on an ATRP process, in which an inventive monofunctional initiator without additional functionality F1 was used. It is readily apparent to the person skilled in the art that an application of the results to a polymerization with a correspondingly F1-functionalized initiator has already been described sufficiently as prior art. The example adduced is only intended to show to what extent the coupling of two prepolymers prepared by means of ATRP is caused by addition of thiols.

The mean molecular weights and the molecular weight distributions are determined by gel permeation chromatography (GPC).

Example 1

A jacketed vessel equipped with stirrer, thermometer, reflux condenser, nitrogen inlet tube and dropping funnel was initially charged under $N_2$ atmosphere with 15 g of methyl methacrylate, 17 ml of butyl acetate, 0.14 g of copper(I) oxide and 0.37 g of PMDETA. The solution is stirred at 70° C. for 15 min. Subsequently, at the same temperature, 0.36 g of ethyl 2-bromoisobutyrate (EBIB) is added. The mixture is stirred at 70° C. for a polymerization time of 3 hours, and a sample is taken for GPC measurement without further product purification (Sample 1). A second 10 ml sample is taken. Air is introduced into it for 30 min, then it is admixed with 1 g of Tonsil Optimum 210FF (from Südchemie), stirred for one hour and then filtered through an activated carbon filter (AKS 5 from Pall Seitz Schenk). The filtration is effected by means of an elevated pressure filtration. A GPC of this sample is also measured (Sample 2).

The polymerization solution remaining in the reaction vessel is admixed with 0.08 g of 2,2'-oxydiethanethiol (from Merck) and stirred at 70° C. for one hour. The previously greenish solution spontaneously changes colour to red when the reagent is added, and a red solid precipitates out. A further GPC of the sample which is then withdrawn is measured (Sample 3).

The remaining solution is admixed with 2 g of Tonsil Optimum 210FF (from Südchemie), stirred for 30 min and subsequently filtered through an activated carbon filter (AKS 5 from Pall Seitz Schenk) under elevated pressure. Beforehand, the formation of a second colourless precipitate could be observed. For further analysis, a sample of this solid is isolated. The average molecular weight and the molecular weight distribution of the second filtrate are also determined by means of GPC (Sample 4).

TABLE 1

| Example | Sample 1 | Sample 2 | Sample 3 | Sample 4 |
|---|---|---|---|---|
| Monomer | MMA | | | MMA |
| Sulphur compound | — | — | oxydiethane-thiol | oxydiethane-thiol |
| Adsorbent | — | Tonsil | — | Tonsil |
| $M_n$ | 6700 | 6800 | 11 000 | 11 000 |
| $M_w/M_n$ | 1.27 | 1.28 | 1.42 | 1.43 |
| Cu concentration | n.d. | 18 ppm | 0.5 ppm | 0.3 ppm |

MMA = methyl methacrylate

It is clearly evident from the examples firstly that the already very good results with adsorbents to remove transition metal complexes (in this case copper complexes) from polymer solutions can be clearly improved by the preceding precipitation with sulphur compounds.

The end group substitution—and consequently the chain coupling—is proved in several ways by characterizing various constituents of the worked-up polymer solution:

1.) The copper precipitate: the red precipitate which forms on addition of the sulphur reagents exhibits, at <10 ppm, an extremely low sulphur content, so that precipitation of the metal as the sulphide can be ruled out.

2.) The polymer: the elemental analysis of the polymer solution exhibits, even after removal of the second, colourless precipitate, a very high sulphur content. Virtually all of the sulphur added to the system is found again in the solution or in the dried product.

3.) The second, colourless precipitate: both $^1$H NMR analyses and IR spectroscopy showed that the precipitate is the ammonium salt of the monoprotonated triamine PMDETA. An elemental analysis showed that this precipitate is sulphur-free. By means of ion chromatography, it was possible, according to the sample, to detect a bromide content between 32% by weight and 37% by weight. This value corresponds to the content in a pure PMDETA ammonium bromide.

4.) The GPC measurements show a significant increase in the molecular weight after the addition of the dithiol. This is virtually a doubling of $M_n$. It can also be shown with Sample 3 that the increase in molecular weight is unaffected by the subsequent purification steps.

The invention claimed is:

1. A process for preparing polymers with functional end groups, comprising:
    polymerizing monomers via atom transfer radical polymerization in the presence of at least one transition metal compound as a catalyst;
    removing the at least one transition metal compound by precipitating the at least one transition metal compound via addition of a first bifunctional sulphur compound and removing the precipitate via filtration; and
    substituting halogen atoms at polymer chain ends via addition of a second bifunctionalized sulphur compound;
    wherein the at least one transition metal compound is selected from the group consisting of copper, iron, cobalt, chromium, manganese, molybdenum, silver, zinc, palladium, rhodium, platinum, ruthenium, iridium, ytterbium, samarium, rhenium and nickel.

2. The process for preparing polymers with functional end groups according to claim 1, wherein the halogen atoms are removed simultaneously from polymers by substituting the halogen atoms to an extent of more than 90% by the addition of the second bifunctional sulphur compound.

3. The process for preparing polymers with functional end groups according to claim 2, wherein the halogen atoms are removed simultaneously from polymers by substituting the halogen atoms to an extent of more than 95% by the addition of the second bifunctional sulphur compound.

4. The process for preparing polymers with functional end groups according to claim 1, wherein the first bifunctional sulphur compound and the second bifunctional sulphur compound are the same bifunctional sulphur compound and the substituting and the precipitating occur simultaneously.

5. The process for preparing polymers with functional end groups according to claim 4, wherein said bifunctional sulphur compound reacts with two different chain ends to couple the two polymer chains to form a high molecular weight chain.

6. The process for preparing polymers with functional end groups according to claim 1, wherein the first bifunctional sulphur compound is added after or during the termination of the polymerization.

7. The process for preparing polymers with functional end groups according to claim 3, wherein a maximum of 1 molar equivalent of the second bifunctional sulphur compound is present based on the concentration of the previously polymerization-active chain ends.

8. The process for preparing polymers with functional end groups according to claim 7, wherein a maximum of 0.7 molar equivalent of the second bifunctional sulphur compound is present based on the concentration of the previously polymerization-active chain ends.

9. The process for preparing polymers with functional end groups according to claim 7, wherein 0.5 molar equivalent of the second bifunctional sulphur compound is present based on the concentration of the previously polymerization-active chain ends.

10. The process according to claim 1, wherein the at least one transition metal compound is at least one copper compound.

11. The process according to claim 10, wherein the at least one copper compound is selected from the group consisting of $Cu_2O$, CuBr, CuCl, CuI, $CuN_3$, CuSCN, CuCN, $CuNO_2$, $CuNO_3$, $CuBF_4$, $Cu(CH_3COO)$ and $Cu(CF_3COO)$, and is added to the system before the start of the polymerization.

12. The process according to claim 1, wherein an initiator which has an active group X is present in the polymerization.

13. The process according to claim 12, wherein the active X group is at least one member selected from the group consisting of Cl, Br, I, SCN and $N_3$.

14. The process according to claim 13, wherein the initiator has a second functionality $F_1$.

15. The process according to claim 14, wherein the second functionality $F_1$ is a hydroxyl, amino, tert-butyl, epoxy, vinyl, allyl, cyano, silyl or azide group.

16. The process according to claim 15, wherein the second functionality $F_1$ is a hydroxyl, amino, tert-butyl or silyl group.

17. The process according to claim 13, wherein the active X group on the chain ends of the polymers is substituted by at least one of the first and second bifunctional sulphur compounds to give a thioether with release of an acid of the form X—H.

18. The process according to claim 1, wherein the catalyst is combined, before the polymerization, with a nitrogen, oxygen, sulphur or phosphorus compound which can enter into one or more coordinate bonds with the at least one transition metal compound to give a metal-ligand complex.

19. The process according to claim 18, wherein the ligands are N-containing chelate ligands.

20. The process according to claim 19, wherein the ligand is protonated by an acid X—H.

21. The process according to claim 20, wherein the ligand is removed from the coordinated transition metal by the protonation.

22. The process according to claim 21, wherein the transition metal is precipitated by the removal of the ligand.

23. The process according to claim 22, wherein the metal content in the polymer solution decreases by at least 80% as a result of the precipitation and the subsequent filtration.

24. The process according to claim 23, wherein the metal content in the polymer solution decreases by at least 95% as a result of the precipitation and the subsequent filtration.

25. The process according to claim 1, wherein the polymers are obtained by polymerizing at least one of alkyl acrylates, alkyl methacrylates, styrenes, vinyl esters, vinyl ethers, fumarates, maleates, itaconates, acrylonitriles, other monomers polymerizable by atom transfer radical polymerization and mixtures of alkyl acrylates, alkyl methacrylates, vinyl esters, vinyl ethers, fumarates, maleates, itaconates, styrenes, acrylonitriles, and other monomers polymerizable by atom transfer radical polymerization.

26. The process according to claim 25, wherein the polymers are obtained by polymerizing at least one of styrenes, alkyl acrylates, alkyl methacrylates, and mixtures comprising styrenes, alkyl acrylates, and alkyl methacrylates.

27. The process according to claim 25, wherein the polymers are obtained by polymerizing at least one of styrenes, alkyl acrylates, alkyl methacrylates, and mixtures consisting essentially of styrenes, alkyl acrylates, and alkyl methacrylates.

* * * * *